United States Patent
Khan et al.

(10) Patent No.: US 9,910,813 B1
(45) Date of Patent: Mar. 6, 2018

(54) SINGLE FUNCTION USING MULTIPLE PORTS

(71) Applicant: Amazon Technologies, Inc., Seattle, WA (US)

(72) Inventors: Asif Khan, Cedar Park, TX (US); Mark Bradley Davis, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 341 days.

(21) Appl. No.: 14/614,356

(22) Filed: Feb. 4, 2015

(51) Int. Cl.
*G06F 13/20* (2006.01)
*G06F 13/42* (2006.01)
*G06F 13/40* (2006.01)
*G06F 13/38* (2006.01)

(52) U.S. Cl.
CPC ........ *G06F 13/4221* (2013.01); *G06F 13/385* (2013.01); *G06F 13/4022* (2013.01)

(58) Field of Classification Search
USPC ......... 710/104–110, 305–317; 709/201–203, 709/213–216
See application file for complete search history.

(56) References Cited

U.S. PATENT DOCUMENTS

| | | | |
|---|---|---|---|
| 9,280,504 B2* | 3/2016 | Ben-Michael | G06F 13/385 |
| 9,529,601 B1* | 12/2016 | Dharmadhikari | G06F 9/4406 |
| 2011/0072204 A1* | 3/2011 | Chang | G06F 12/0284 711/103 |
| 2011/0320861 A1* | 12/2011 | Bayer | G06F 11/2033 714/5.11 |
| 2012/0260015 A1 | 10/2012 | Gay et al. | |
| 2015/0143018 A1* | 5/2015 | Kim | G06F 13/4022 710/316 |
| 2015/0234768 A1* | 8/2015 | Bass | G06F 13/4081 710/302 |
| 2016/0011995 A1* | 1/2016 | Bouley | G06F 13/28 710/308 |
| 2016/0224355 A1* | 8/2016 | Okubo | G06F 9/44505 |

OTHER PUBLICATIONS

U.S. Appl. No. 14/614,360, filed Feb. 4, 2015, Titled: Distributed Function Management Using Multiple PCIE Ports.

* cited by examiner

*Primary Examiner* — Raymond Phan
(74) *Attorney, Agent, or Firm* — Kilpatrick Townsend & Stockton LLP

(57) ABSTRACT

An electronics adapter, system, and methods for using multiple interface ports to execute a single function are disclosed herein. The electronics adapter may include multiple interface ports, each having a transmission capacity for data transmitted via each interface port. Processing logic may be coupled to the two or more interface ports, to execute processes associated with the multiple interface ports utilizing a bandwidth. The electronics adapter may further include a controller to configure and merge the data from the multiple interface ports based at least in part on the transmission capacities for the multiple interface ports to support the bandwidth of the processes.

16 Claims, 10 Drawing Sheets

SINGLE FUNCTION USING MULTIPLE PORTS

CROSS-REFERENCE TO RELATED APPLICATION

This application incorporates by reference for all purposes the full disclosure of co-pending U.S. patent application Ser. No. 14/614,360, filed Feb. 4, 2015, entitled "DISTRIBUTED FUNCTION MANAGEMENT USING MULTIPLE PCIE PORTS".

BACKGROUND

Electronic devices can communicate with each other using a number of high speed interfaces to transmit data for a variety of functions and processes. Various standards and protocols are employed by the electronics and semiconductor industry for transmitting and configuring these interfaces. A host device may be coupled to another device, such as an input/output (I/O) device using an interconnect with a host interface and the I/O device interface having a predetermined bandwidth, size, and protocol. The host device and I/O device may be coupled via their interfaces to execute a set of particular functions, and the functions are limited by the bandwidth of the interfaces. Having larger interfaces capable of higher bandwidths to accommodate more complex functions can be expensive to employ and/or difficult to configure.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the disclosed technologies described herein generally pertain to computing devices and more particularly to system peripheral devices control and management utilizing high speed data interfaces. Other embodiments disclose systems and methods of utilizing multiple smaller interface ports for the transmission of data for supporting a single function between the host device and one or more I/O devices. According to various embodiments described herein, for example, in an I/O device having multiple PCIe ports, a single function can use multiple ports for transferring data. This enables the function to use more bandwidth, because the function can utilize the bandwidth associated with multiple ports.

Techniques described herein include methods and systems for using multiple discrete interface ports to masquerade as a single connection for a single function while a host computing system still views the plurality of interfaces as discrete peripheral devices. Such techniques are described in further detail with reference to FIGS. 2, 3, 4 and 5.

In certain other embodiments, a function can use any of the ports from the multiple ports using a dynamic and/or updatable mapping between the function and the interface ports on the I/O device. In a Non-Uniform Memory Access (NUMA)-type system, such a dynamic and updatable mapping between the function (and/or subset of the function) and the interface port allows the right processor to be targeted for the function to reduce traffic between processors in the NUMA system. Such techniques are described in further detail with reference to FIGS. 6, 7 and 8.

Although Peripheral Component Interconnect express (PCIe) interfaces and protocols are described herein, disclosed embodiments are not limited to PCIe interfaces and protocols, but may be applied to any suitable high speed interfaces and protocols with applications that may implement expanded bandwidth for a single function or distributed function management across multiple interface ports.

Figure 1:
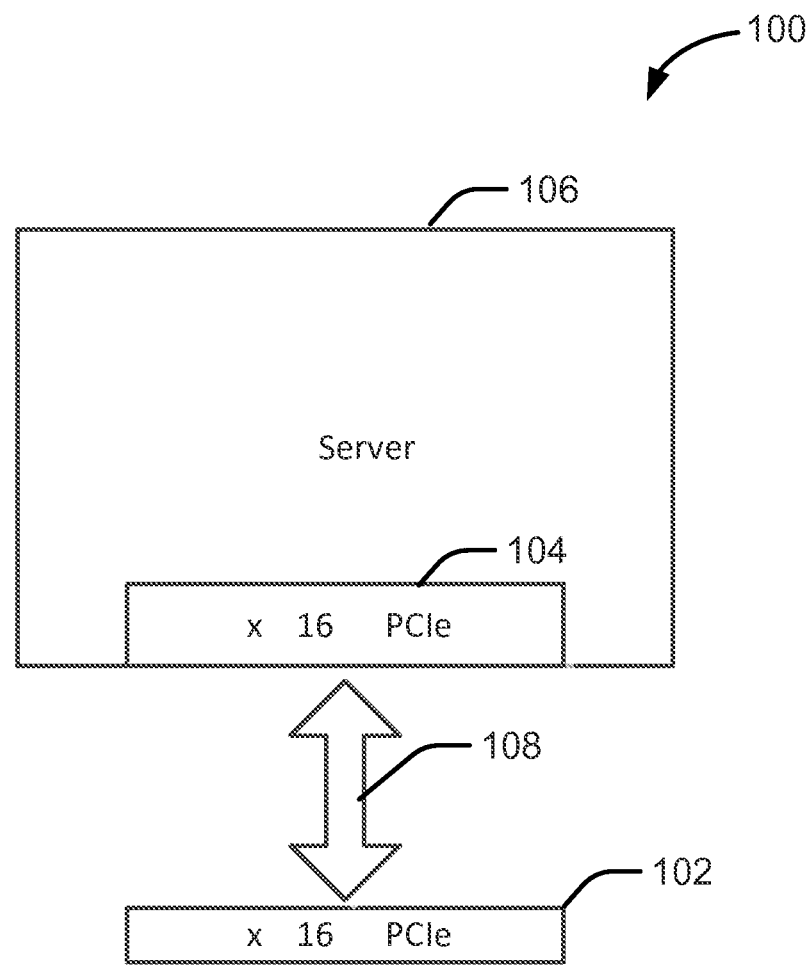
FIG. 1 illustrates a block diagram of an example system of an external device coupled to a host server computer according to an embodiment.

FIG. 1 illustrates a block diagram of an example system 100 having a x16 PCIe controller 102 as part of an I/O device in communication with a x16 PCIe port 104 of a host server computing device 106. As shown in FIG. 1, the x16 PCIe controller 102 can support a link 108 having 16 lanes of data as one port.

Generally, with the increasing need of bandwidth between devices, the width of the port is increased to support additional lanes. For example, the width of a link may be doubled to x32. However, increasing the width of the link linearly results in an exponential increase in the complexity of the design. Such designs may result in higher development costs, consume more die area and lead to more design and implementation errors. For example, with the increase in the width of these high speed and frequency links, cross-talk between the links may increase, resulting in corruption in data. In another example, with the increase in the lane width, generally cyclic redundancy check (CRC) calculations become more complex requiring more time, adversely affecting the set and hold constraints of the design.

Furthermore, depending on the functionality and I/O transactions conducted between the PCIe device with the PCIe controller 102 and the host server computing device 106, some flexibility in the bandwidth may be desired, as some functions requested may not utilize the entire bandwidth of x16.

Each PCIe controller 102 may be connected to the host server computing device 106 through a dedicated set of wires, shown as link 108 in FIG. 1. PCIe provides interconnection standards for coupling peripheral (e.g., external) devices to a host computing system 106 (e.g., host server computer, server computer). The host computing system 106 can include processing logic to implement a root complex such that one or more PCIe ports of the host can be connected to one or more endpoints. PCIe is based on point-to-point topology, with separate serial links connecting every peripheral device to the root complex (host), another endpoint, or a switch, for example. In PCIe, the transmission of data occurs in packets transmitted over dedicated lines, with flow control, error detection and retransmissions.

To illustrate, a minimal (x1) PCIe connection merely consists of four wires (e.g., lines or lanes) for data transmission (two differential pairs in each direction) and another pair of wires to supply the card with a reference clock. Conceptually, each lane is used as a full-duplex byte stream, transporting data packets in eight-bit "byte" format, between endpoints of a link, in both directions simultaneously. As shown in FIG. 1, a PCIe device has a x16 PCIe port 102 supporting a link 108 of x16 lanes and is coupled with the x16 PCIe port 104 of the host server computing device 106.

PCIe interfaces may also be used in a variety of other standards, such as protocols for laptop expansion card interfaces, and in Serial Advanced Technology Attachment (SATA) which is a computer storage interface. The data packet for forwarding may include an identifier indicating its origin and functionality. There are several types of data packets that may be transmitted in PCIe protocols: transaction layer packet (TLP), data link layer packet (DLLP), and physical layer packet (PLP).

In various embodiments of the disclosed technologies, any PCIe device capable of creating, transmitting, and receiving any of the TLP, DLLP, PLP, or any suitable PCIe packet may be implemented.

PCIe ports can be implemented with different numbers of lanes, and may contain from one to thirty-two lanes. A larger number of lanes give more bandwidth on the link. Typical PCIe widths are x8 (8 lanes of bandwidth), and up to x16 for high performance applications. However, as previously discussed, higher implementation costs are associated with links with wider lanes. Thus, according to certain embodiments disclosed herein, methods and systems are described for using multiple smaller ports, such as two x8 ports to achieve similar bandwidth associated with x16 designs without the complexity of x16 hardware implementation.

Figure 2:
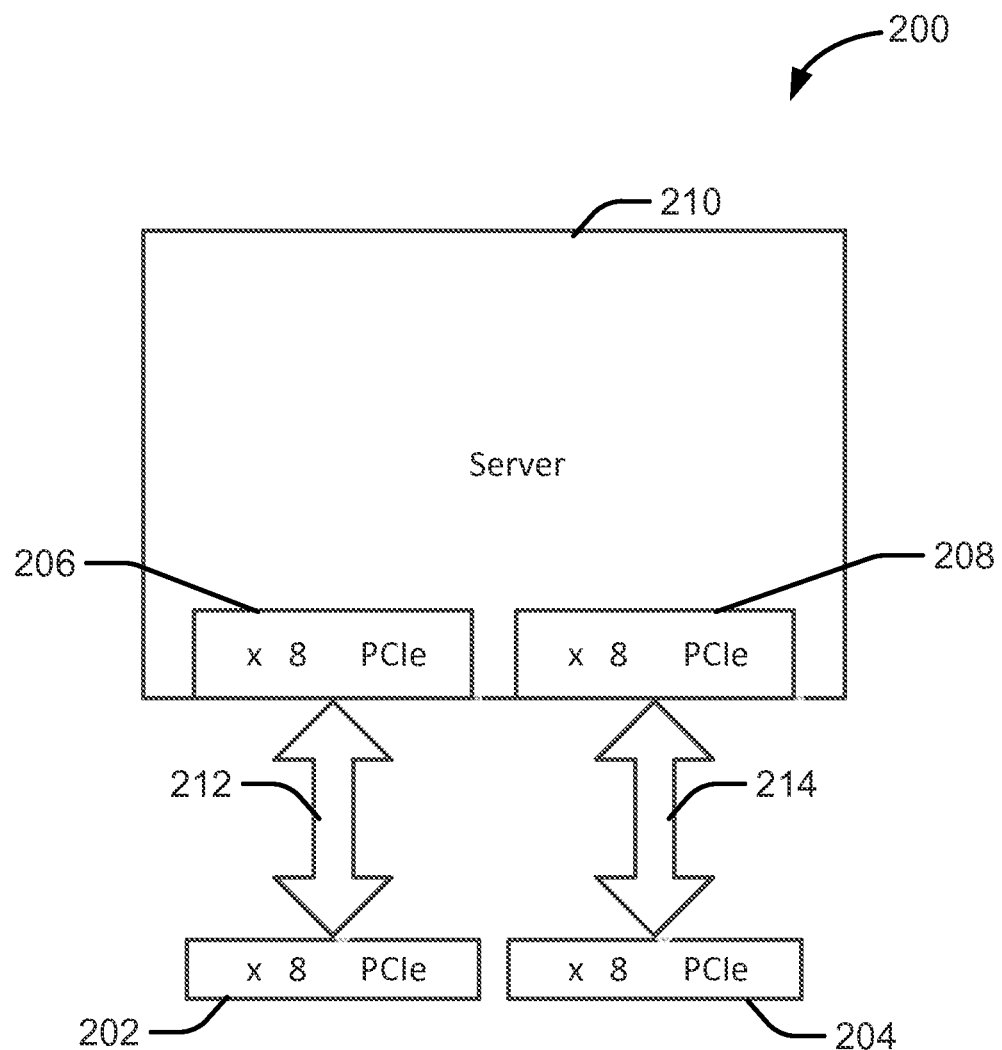
FIG. 2 illustrates a block diagram of an example system of multiple external devices coupled to a host server computer according to an embodiment.

FIG. 2 illustrates a block diagram of an example system 200 having two x8 PCIe controllers 202 and 204 coupled to their mating interfaces 206 and 208 of the host server computing device 210. In this configuration, the two ports 202 and 204 are completely independent as separate discrete devices that are coupled to each PCIe port 206 and 208 of the host server computing device 210. The x8 port 202 transmits and receives data to and from the x8 port 206 of the host server computing device 210 via a x8 bus 212. The x8 port 204 transmits and receives data to and from the x8 port 208 of the host server computing device 210 via another x8 bus 214.

The host server computing device 210 may view ports 206 and 208 as separate discrete devices. Therefore, the first device with the x8 PCIe controller 202 cannot use the bandwidth of the second device with the x8 PCIe controller 204. The x8 PCIe port 202 cannot use the bus 214 to communicate with the x8 PCIe port 208, for example, or vice versa. Thus, various functionality and data transmissions between the first device and the host server computing device 210 are limited by the bandwidth of the PCIe port 202. For example, an I/O transaction needing x16 bandwidth via port 202 would be unable to merge or share lanes of data between links 212 and 214. As discrete devices, the device connected to one port cannot utilize bandwidth available on the other port.

Figure 3:
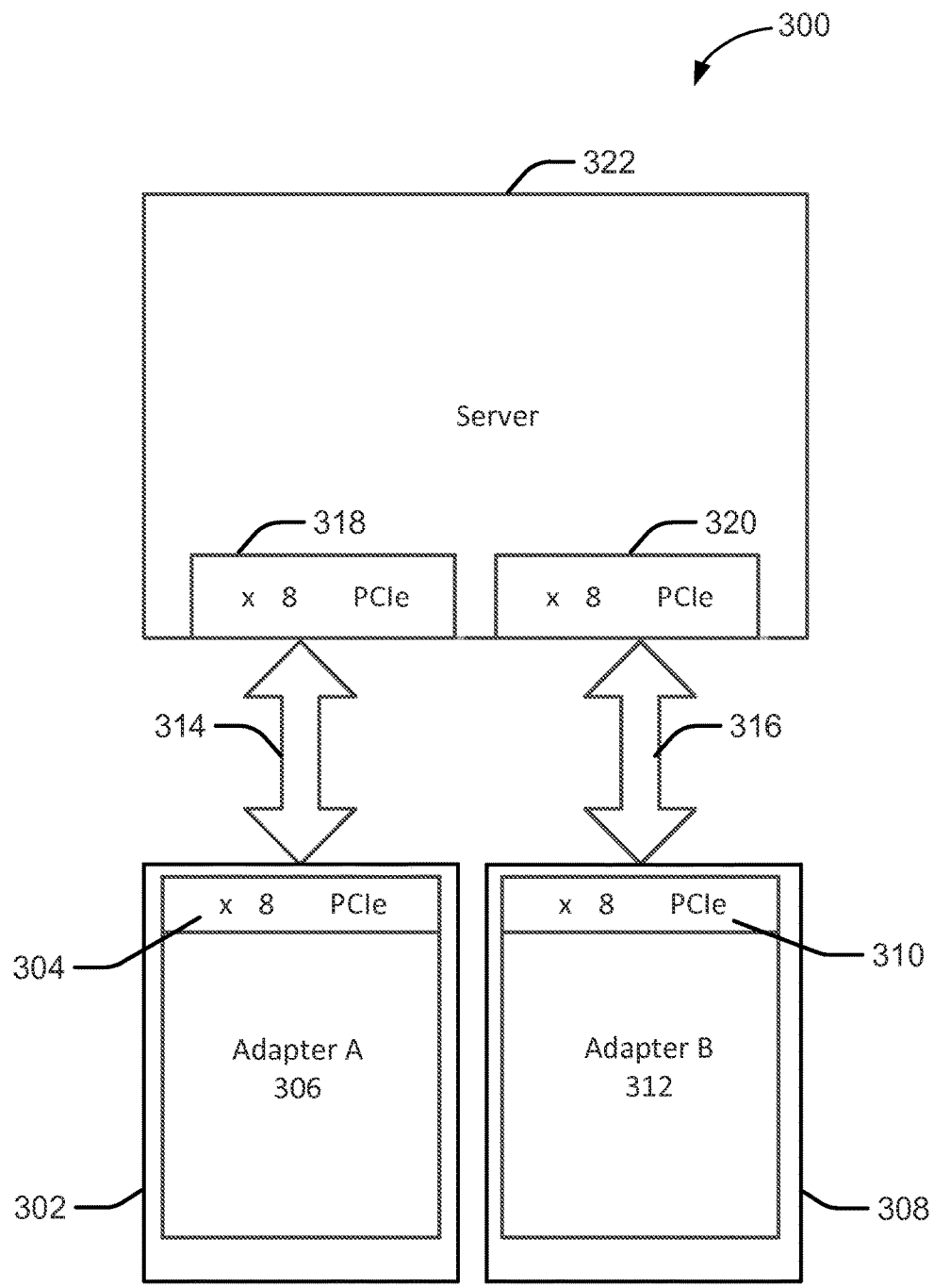
FIG. 3 illustrates a block diagram of an example system of multiple external devices coupled to a host server computer according to an embodiment.

FIG. 3 illustrates an example system 300 according to at least some embodiments of the disclosed technologies. Each PCIe device includes a PCIe port with a corresponding function. The function comprises functionality with transactions to transmit data between the PCIe device and the host computing system, such as the host computing processor and non-transitory storage medium (not shown), via the host computing system's PCIe interfaces. As shown in system 300, there are two discrete PCIe devices, 302 and 308. PCIe device 302 comprises Adapter A 306 and a x8 PCIe interface 304. A second PCIe device 308 comprises Adapter B 312 and a corresponding x8 PCIe interface 310. Adapter A 306, via its corresponding x8 PCIe port 304, may be in communication with the host server 322 via the host server x8 PCIe port 318. The transmission of data between PCIe device 302 and the host server 322 occurs via link 314. The link 314 bandwidth corresponds to the transmission capacities of the PCIe ports 304 and 318, which have 8 lanes each. Adapter B 312, via its corresponding x8 PCIe port 310, may be in communication with the host server 322 via the host server x8 PCIe port 320. The transmission of data between PCIe device 308 and the host server 322 occurs via link 316. The link 316 bandwidth corresponds to the transmission capacities of the PCIe ports 310 and 320, which are 8 lanes.

Discrete PCIe devices 302 and 308 may have PCIe ports of different capacities depending on their corresponding adapters and functionality. For example, PCIe device 308 may have a x16 or x4 PCIe port 310. PCIe ports 304 and 310 may have different lane widths. The PCIe port on the host server 322 may have a lane width matching its corresponding PCIe port on the device to couple to. For example, PCIe port 320 of the host server 322 may have the same lane width as PCIe port 310 of the device 308. Similarly to the system 200 in FIG. 2, in system 300, Adapter A 306 is limited to a x8 link 314 worth of bandwidth, and cannot use any bandwidth from the port 310 connected to Adapter B 312.

Figure 4:
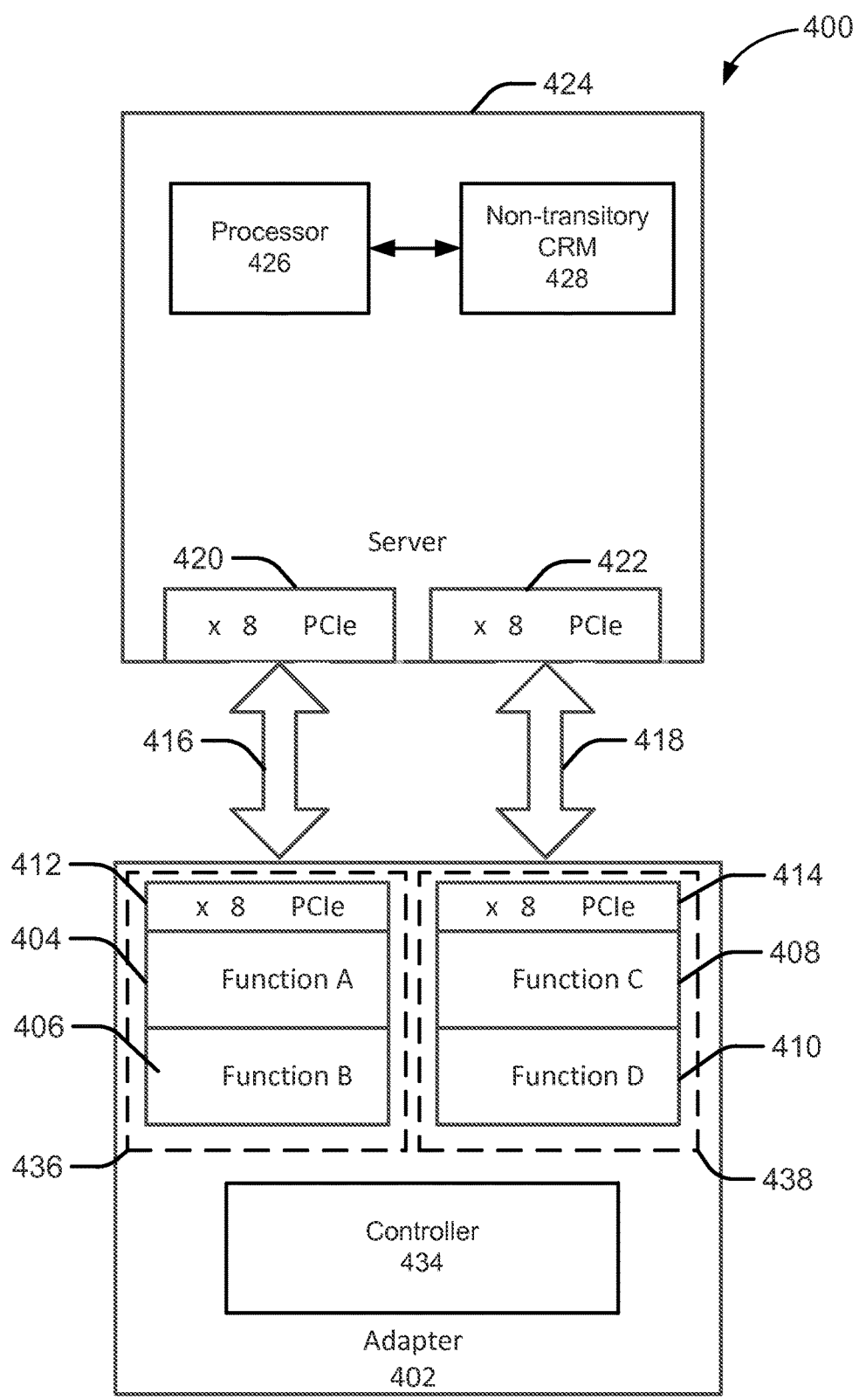
FIG. 4 illustrates a block diagram of an example system of multiple external devices coupled to a host server according to an embodiment.

FIG. 4 illustrates an example system 400 according to embodiments of the disclosed technologies. System 400 illustrates a single I/O device or I/O adapter 402 that comprises two x8 ports. According to aspects of the disclosure, an endpoint, such as a particular I/O adapter 402 can utilize x16 or close to x16 worth of bandwidth using two x8 PCIe ports (412 and 414).

In certain embodiments, the I/O adapter 402 may utilize the bandwidths of multiple PCIe ports for transmitting data between the I/O adapter 402 and host 424. The host may view the multiple PCIe ports as discrete devices, similar to FIGS. 2-3, even though at the I/O adapter 402, the multiple PCIe ports are part of the same I/O adapter 402.

The I/O adapter 402 transmits data using the multiple PCIe ports using a set of real operative functions and corresponding non-operative mirror functions. At the I/O adapter 402, when a transaction is received or initiated, the controller 434 determines the (real operative) function associated with the data to be transmitted between the I/O adapter 402 and the host 424. Previously, the data would have been transmitted over the PCIe port mapped to the function. However, according to embodiments of the disclosure, the data associated with a (real operative) function can be transmitted via the real (operative) function and/or a (non-operative) mirror function, where the mirror function is mapped to a PCIe port from the multiple PCIe ports different from the PCIe port to which the operative function is mapped.

The I/O adapter 402 can initiate transmission of data over two PCIe ports 412 and 414 by sending one or more requests via a first x8 port 412 and one or more requests via a second x8 port 414. For example, for reading data from the host for a single function (associated with a single PCIe port), the I/O adapter 402 may generate read requests to the host over multiple PCIe ports, each read requesting a portion of the data to be transmitted from the host 424 to the I/O adapter 402. The host 424 treats each request received over each of the multiple PCIe ports as a discrete request for data from different functions of the I/O adapter 402 and completes each request independently.

Similarly, for a write request for data from the I/O adapter 402 to the host 424 for a single function, the I/O adapter 402 may generate write requests to the host 424 over multiple PCIe ports, each write request indicating that a portion of the data is to be transmitted from the host 424 to the I/O adapter 402 over the respective PCIe port.

Each function may be mapped to specific PCIe ports. For example, in FIG. 4, PCIe port 412 is configured for Function A 404 and Function B 406 and PCIe port 414 may be configured for Function C 408 and Function D 410. To the host 424, each PCIe port (i.e., ports 412 and 414) is visible as a discrete device, each with a set of functions. Thus, in system 400, an operating system (OS) at the host 424 may view port 412 as a first device 436 having Function A 404 and Function B 406, and port 414 as a second device 438 having Function C 408 and Function D 410.

As such, in FIG. 4, a single function at the I/O adapter 402 may be allocated x16 worth of bandwidth, by borrowing an identity of a function connected to the other PCIe port. Each function has a function identifier. For example, the operative function has an identifier, possibly a unique identifier, and its corresponding non-operative mirror function has a unique identifier different from the function identifier of the operative function. Thus, when the host sees the operative function identifier and the mirror identifier, the host views them as separate functions. However, at the I/O adapter 402, the operative function may borrow the identity of the mirror function, such that the mirror identifier is mapped to the operative function identifier. For example, Function A 404 could borrow the identity of Function C 408 and use both x8 PCIe links 416 and 418, such that the controller 434 may route data for Function A through both port 412 and port 414 by way of Function C. Alternatively, data received at port 414 for Function C may be routed to Function A.

In the above example, for a transaction associated with Function A, the controller 434 on the I/O adapter 402 may be configured to generate read/write requests to route data using both Function A (for PCIe port 412) and Function C (for PCIe port 414). For a write transaction, the controller may split the data to use the multiple functions and their corresponding PCIe ports. For a read transaction, the controller 434 may be configured to route the data received at the multiple PCIe ports (e.g., ports 412 and 414) to the same function. Multiple requests (e.g., request to read or write) and different requests may be transmitted via different interface ports. For example, a single write request can be sent over multiple interface ports, but a read request may be sent out over one interface port, and the corresponding response to the request (e.g., data read from a host) is received at the same interface port.

In some embodiments, the I/O adapter initiates the bulk of the data transfer requests (e.g., write requests) as an upstream transmission of data to the host, and may include both real operative functions and non-operative mirror functions using ports 412 and 414. In another embodiment, downstream transmissions of data initiated from the root complex will go to the real operative function. For a read request, the data transfer (e.g., downstream transmission of data) occurs as a response to the read request (e.g., upstream read request). Because the root complex is blind or unaware of the mirroring on the adapter side, downstream transmissions initiated by the host may be directed to the real operative function instead of the mirror function. However, generally, high bandwidth transfers are initiated by the adapter in an upstream transmission to the host.

In certain embodiments, minor updates to the host side may be needed to enable at least some embodiments described in the disclosure. The host 424 may include a processor 426 coupled to a non-transitory computer readable storage medium 428 and a controller 430. The non-transitory computer readable storage medium 428 may comprise code executable by the processor 426 to host an operating system (OS), a root complex, and/or any other suitable processes. For example, the root complex of the host 424 may program an I/O memory management unit (IOMMU) corresponding to each port (e.g., 420 and 422) such that the real operative function and its corresponding non-operative mirror function have the same programming. The IOMMU may provide address translation and protection mechanisms that control access by each of the functions of its associated port. The IOMMU protection can be modified in the OS of the host 424 to associate the real operative function with the non-operative mirror function, and vice versa, using their corresponding identifiers. In this manner, the root complex may have the same memory address translations and permissions for the data reads/writes associated with the operative function and the corresponding non-operative functions. Therefore, writes from the I/O adapter to the host for the data to specific addresses using two PCIe ports with two different functions may get translated the same way using the same programming at the IOMMU associated with the two different functions, such that the data is written to memory as if the writes were processed using a single PCIe port, a single function and using the same IOMMU memory translations and protections.

Methods and techniques executed and illustrated by system 400 of FIG. 4 are not limited to two x8 ports forming a x16 link. Other configurations may include two x16's or four x8's to create a x32 link. In certain instances, similar techniques discussed with reference to FIG. 4 can be used for larger ports. For example, in a configuration with multiple ports, each having a x16 worth of bandwidth, two PCIe ports of x16 can be used to give a single function x32 worth of bandwidth. Because of complexities in designing and configuring larger high speed data interfaces, particularly PCIe interfaces, embodiments of the disclosed technologies enable the utilization of multiple PCIe ports for a single function requiring a larger bandwidth without using a larger data interface. This allows for bandwidth capabilities greater than what standard PCIe interfaces having a maximum of x32 lanes allow.

Figure 5:
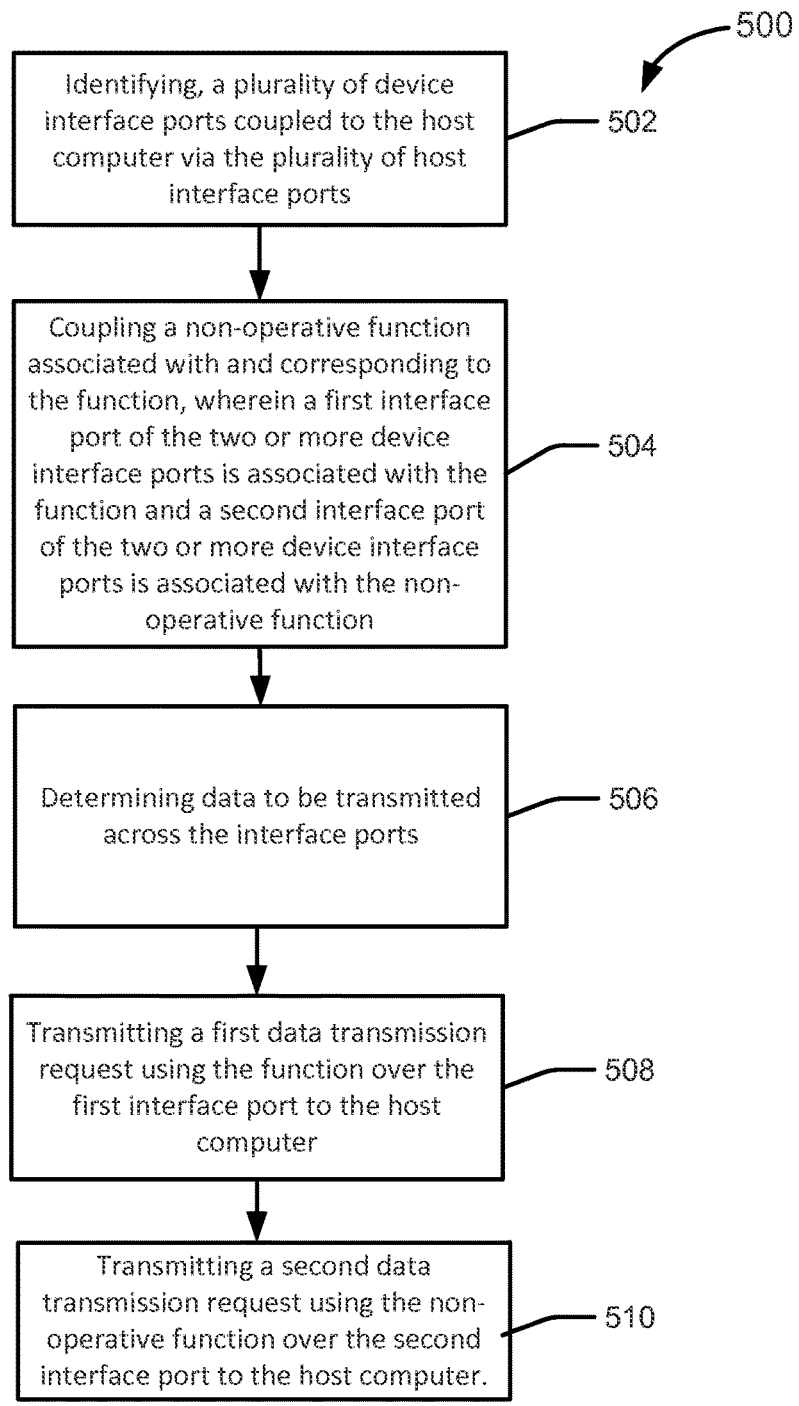
FIG. 5 shows a flow diagram illustrating an example method of using multiple interface ports for a single function according to an embodiment.

FIG. 5 is a flow diagram illustrating a method 500 of executing a single function using multiple PCIe ports according to embodiments of the disclosed technologies. At step 502, a component of an electronics adapter (e.g., I/O adapter) identifies a plurality of device interface ports to be coupled to a host computer via the plurality of host interface ports. At step 504, a component of the electronics adapter determines and couples a non-operative function corresponding to the function, wherein a first interface port of the two or more device interface ports is associated with the function and a second interface port of the two or more device interface ports is associated with the non-operative function. The non-operative function is associated with the function in that a unique identifier for the non-operative function maps to the identifier of the function.

At step 506, the electronics adapter determines data to be transmitted between the electronics adapter and the host computer. At step 508, the electronics adapter transmits a first data transmission request using the function via the first interface port to the host computer. At step 510, the electronics adapter transmits a second data transmission request using the non-operative function over the second interface port to the host computer. In one instance, the first data transmission request and the second data transmission request may request reading data from the host computer coupled to the device. In another instance, the first data transmission request and the second data transmission request may be for writing data to a host coupled to the electronics adapter using the first interface port and the second interface port, respectively. The first transmission request and the second transmission request may be for a single transaction for data transfer (e.g., a write request). Alternatively, the first transmission request and the second transmission request may be separate transactions for data transfers, which determines which interface port to use.

In at least one embodiment, transmitting the request for the transaction using the at least one interface port results in transmitting the transaction data using the at least one interface port. For example, a request to write data may also include the data transfer of data to be written to the host. Alternatively, in another example, a request to read data may be transmitted without the data transfer, but the data transfer is received in a response to the request, such that the data is received by the electronics adapter.

It should be appreciated that the specific steps illustrated in FIG. 5 provide a particular method of using multiple interface ports for a single function, according to one embodiment. Other sequences of steps may also be performed in alternate embodiments. For example, alternative embodiments may perform the steps/blocks outlined above in a different order. Moreover, the individual steps/blocks illustrated in FIG. 5 may include multiple sub-steps that may be performed in various sequences as appropriate to the individual step. Furthermore, additional steps/blocks may be added or removed depending on the particular applications. One of ordinary skill in the art would recognize and appreciate many variations, modifications and alternatives of the process.

Although embodiments as described above may use PCIe, several different protocols and endpoints, such as Peripheral Component Interconnect (PCI) or Serial Advanced Technology Attachment (SATA), may be used. Accordingly, the two or more server interface ports can be Peripheral Component Interconnect (PCI), PCIe, or Serial Advanced Technology Attachment (SATA). Other protocols that may be used in embodiments herein include Infiniband and RapidIO.

According to other embodiments of the disclosed technologies, multiple functions may be associated with multiple devices. Functionality of the multiple devices may include virtualized inputs. Embodiments of the disclosed technologies can provide virtual devices the ability to flexibly expand their bandwidth for complex functions using multiple, smaller, more manageable PCIe ports on the adapter connected to all the devices.

It can also be beneficial to route data packets from a larger PCIe port to multiple smaller PCIe ports because, for example, smaller high speed data interfaces can have lower jitter, interconnect interference, and lower complexity compared to large high speed data interfaces. Furthermore, according to embodiments of the disclosed technologies, multiple PCIe devices with multiple functionalities may be unified by the I/O adapter to connect to a host device. Thus, a single network device may be used as opposed to multiple different devices connecting to the host. As such, the single network device may use multiple PCIe ports, even for a single function.

Embodiments of the disclosed technologies further provide flexibility in the bandwidth of the adapter connected to the host. Typically, each I/O PCIe device must match the width to the I/O port at the host. However, with the adapter unifying multiple PCIe ports, sharing of the bandwidth between ports may be implemented. The sharing of bandwidth over the data links may be advantageous in configurations involving a multi central processing unit (CPU) server, for example.

Figure 6:
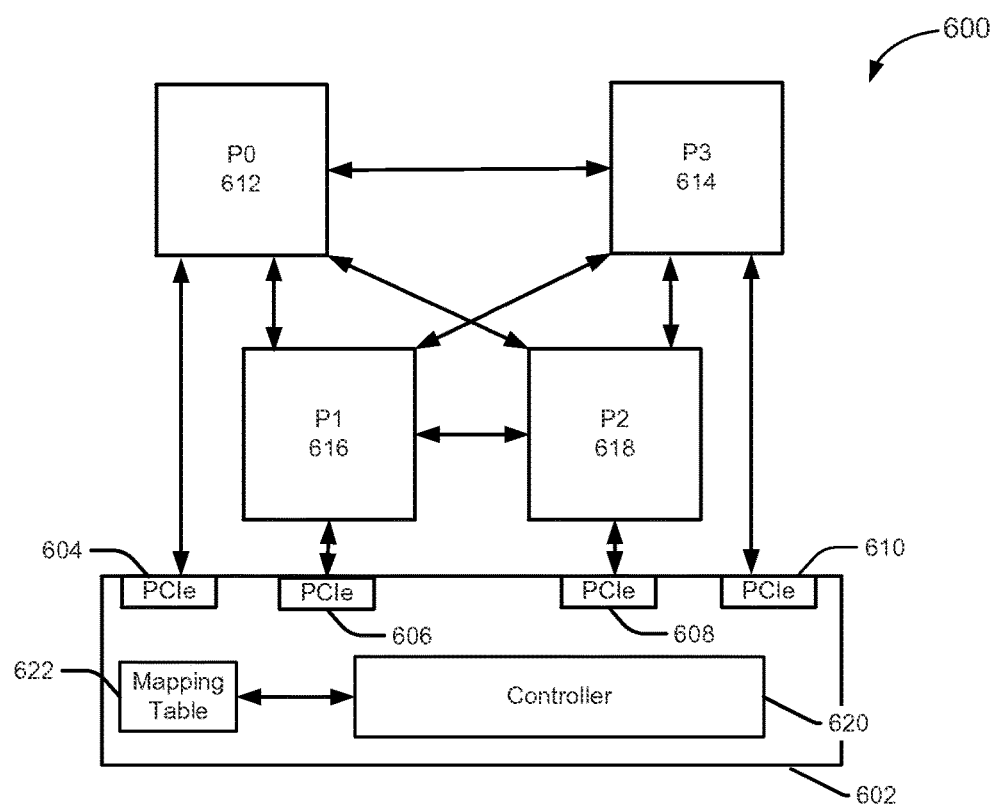
FIG. 6 illustrates a block diagram of an example of a distributed function system using multiple interface ports according to an embodiment.

FIG. 6 illustrates an example non-uniform memory access (NUMA) system 600 according to embodiments of the disclosed technologies. The NUMA system 600 includes a device 602 with multiple PCIe ports 604, 606, 608, and 610. The ports 604, 606, 608, and 610 may have associated functions with each port and may be compatible with any high speed data interface protocol comparable to PCIe. Each PCIe port may be directly coupled to a processor in a cluster of processors that are interconnected amongst them. Port 604 may be coupled to processor P0 612, port 606 may be coupled to processor P1 616, port 608 may be coupled to processor P2 618, and port 610 may be coupled to processor P3 614. Processor P0-612, P1-616, P2-614, and P3-618, respectively, may also be interconnected with each other via any suitable CPU clustering interconnect, such as Intel QuickPath Interconnect (QPI) or HyperTransport.

NUMA systems such as the system 600 may be used in multiprocessing, where the memory access time depends on the memory location relative to the processors 612, 614, 616, and 618. Under NUMA, each processor 612, 614, 616, and 618 can access its own local memory faster than non-local memory (memory local to another processor or memory shared between processors). NUMA systems may be beneficial for workloads on servers where the data are often associated strongly with certain tasks, functions, or users. The functions may be associated with each port 604, 606, 608, and 610 of the I/O adapter 602.

The I/O adapter 602 may comprise a controller 620 and a mapping table 622. The mapping table 622 may be dynamically updatable, allowing for a dynamic association between any given function and a PCIe port. A dynamic and updatable mapping between any given function and the PCIe ports allows any function to be mapped to a PCIe port, such that the processor directly coupled to the PCIe port executes CPU instructions to service the function. The CPU instructions can be a driver or a sub-set of a driver. In some embodiments, the CPU instructions can map a sub-set of the function, for example, TX, RX, and/or different Queues of the function.

For a given transaction, the controller 620 communicatively coupled to the PCIe ports may be configured to determine a function for the transaction. The controller 620 further determines at least one PCIe port to transmit the transaction based on the function, and transmits a request for the transaction using the PCIe port for processing of the transaction by the at least one of the plurality of processors coupled to the interface port. According to embodiments of the disclosure, the function may be serviced by CPU instructions (e.g., a driver) executed by a processor, wherein the processor is directly coupled to the PCIe port.

In certain instances, the updatable mapping 622 between the functions and the PCIe ports allows for any one of a number functions on the I/O adapter 602 to be mapped to any of the plurality of ports so that if the CPU instructions (e.g., driver) associated with a particular function are migrated from one processor to another, the I/O adapter 602 can update the mapping 622 such that the function is mapped to the PCIe port that is coupled to the processor that the CPU instructions had migrated to.

In certain aspects, transmitting the request for the transaction using the PCIe port results in transmitting of the transaction using the interface port. In some instances, as shown in more detail in FIG. 7, attributes of the transaction associated with a function may be processed using a separate driver or CPU instructions. Examples of attributes of the transaction associated with a function may include an I/O type, a data capacity of the function, one or more sub-functions, a timing specification for the function, a receive transaction, a transmit transaction, a processing capacity for the function, or any other characteristics of the I/O, transaction, or function.

Figure 7:
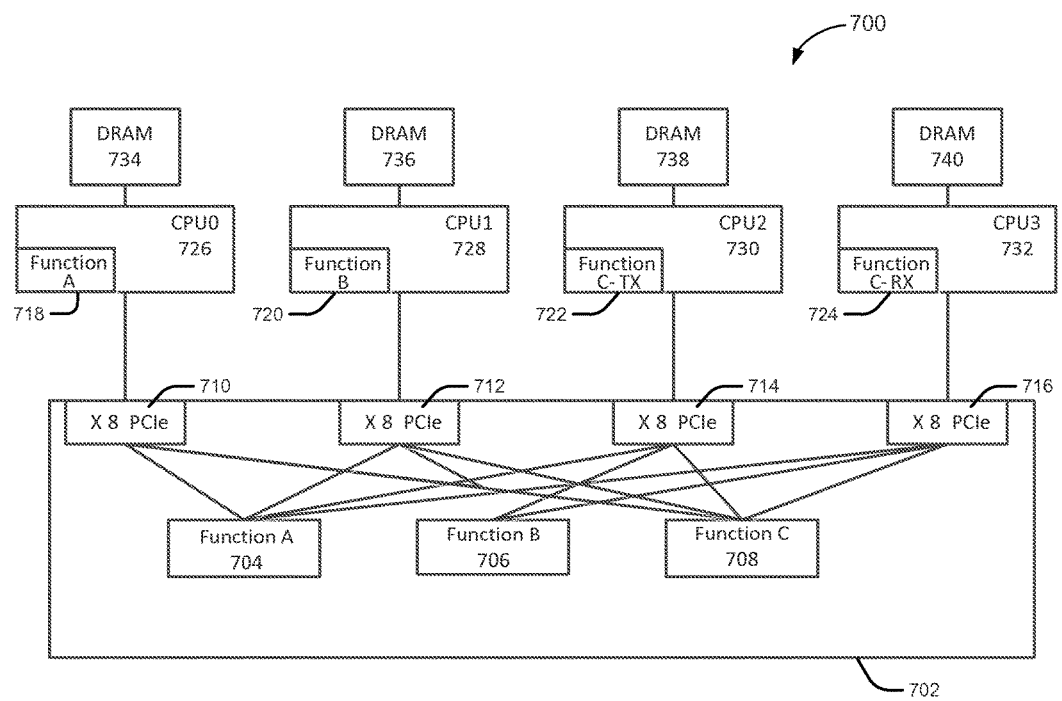
FIG. 7 illustrates a block diagram of an example of a distributed function system using multiple interface ports according to an embodiment.

FIG. 7 illustrates an example non-uniform memory access (NUMA) system 700 according to embodiments of the disclosed technologies. The NUMA system 700 includes an SOC adapter 702, which may be communicatively coupled to a plurality of processors (CPU0 726, CPU1 728, CPU2 730, and CPU3 732). The plurality of processors 726, 728, 730, and 732 may have access to a plurality of memories. In the example system 700, the processors 726, 728, 730, and 732 have access to dynamic random access memories (DRAM) 734, 736, 738, and 740, respectively. In some embodiments, the plurality of memories are shared between the various processors. The processors may be interconnected by various inter-processor protocols, for example QPI, or any other suitable CPU clustering interconnect. In other embodiments, the memories may be non-transitory or transitory.

Each of the processors 726, 728, 730, and 732 may be configured to have CPU instructions implemented as a driver for an associated function and an associated PCIe port (not shown). For example, Function A driver 718 may be associated with CPU0 726 and the PCIe port connected to CPU0 726, Function B driver 720 may be associated with CPU1 728 and the PCIe port connected to CPU1 728, Function C-TX driver 722 may be associated with CPU2 730 and the PCIe port connected to CPU2 730, and lastly, Function C-RX driver 724 may be associated with CPU3 732 and the PCIe port connected to CPU3 732. Function C-TX driver 722 may process the transmit data and data links for Function C 708 on the adapter 702, and Function C-RX driver 724 may process the receive data and associated data links for Function C 708.

The adapter 702 may comprise multiple PCIe ports associated with a particular function. The multiple PCIe ports each have a bandwidth, for example, x4, x8, x16, etc. The multiple PCIe ports may all have the same uniform bandwidth or may be of varying size. In the system 700 of FIG. 7, the PCIe ports 710, 712, 714, and 716 are x8 PCIe ports. However, in various embodiments of the disclosed technologies, the ports 710, 712, 714, and 716 may be all x4 ports, ports 710 and 712 may be x8 ports while ports 714 and 716 are x4 ports, etc. The PCIe ports may be of any combination of size, but each port may be associated with one or more particular functions. The adapter 702 may further comprise logic for a plurality of functions, such as Function A 704, Function B 706 and Function C 708.

For example, in FIG. 7, Function A 704 may be mapped to CPU0 726. Thus, CPU instructions, such as a driver, associated with Function A 718 may be executed by CPU0 726 to service Function A 704. The adapter 702 may determine to service Function A 704 out of port 710 because port 710 is communicatively coupled to CPU0 726 where the Function A driver 718 is running.

However, depending on applications and the shared infrastructure of the plurality of processors 726, 728, 730, 732 and their memories 734, 736, 738, the Function A driver 718 may move to CPU3 732. Accordingly, for the Function A 704, the adapter 702 may route Function A 704 to port 716, such that the data packets may be transmitted via port 716 directly to CPU3 732.

Embodiments of the disclosed technologies with respect to NUMA provide robust migration of CPU instructions (e.g., drivers) associated with functions across various processors. When the driver for an operative function is moved to a different CPU (e.g., Function A driver 718 moving from CPU0 726 to CPU3 732), instead of having Function A routed to port 710, Function A may be routed to port 716 in the adapter 702. When the re-rerouting is performed on the adapter side, inter-CPU traffic over the CPU clustering interconnect across the plurality of processors 726, 728, 730, and 732 may be reduced by eliminating the need to route Function A 704 from port 710 to CPU0 726, rerouting via the CPU clustering interconnect to CPU3 732, rerouting the response via QPI back to CPU0 726, and then transmitting Function A to port 710 of the adapter 702.

Another possible advantage is, in a NUMA system, functions can use the PCIe port connected to the CPU that is running the specific CPU instructions (e.g., driver instance), or specific aspects of a single function can be mapped to the PCIe port associated with that aspect of the function (e.g., receive, transmit, interrupt processing, etc.). Accordingly, the adapter can select the best interface port for the transaction based on the functions associated with the interface ports. In certain embodiments, there may be fewer interface ports than processors, or more interface ports than processors. The target processor may not be directly coupled to the interface port. The best interface port is determined using the mapping, which has the best port for that functionality.

According to another embodiment of the disclosed technologies, in some applications there may be a hypervisor managing the virtual resources on the plurality of processors. The hypervisor may manage the resources of the cluster of processors to determine which processor should run the desired CPU instructions (e.g., driver) associated with a function depending on current loads of the processors. A processor having a lower load may be identified as being optimal for running a transaction; thus the hypervisor may re-route the transaction to the lower-loaded processor that is more available. Accordingly, the I/O adapter may be notified for updating the mapping between the function (and/or sub-function associated with specific attributes of the function). Accordingly, the I/O adapter routs the data associated with the function using the updated mapping to the PCIe port coupled to the processor executing the CPU instructions, for example the driver, associated with the function.

When the adapter is notified of a re-mapping of the function drivers or CPU instructions to a different processor because of current loads, the adapter may update the mapping in an address translation table.

The device 600 of FIG. 6 and device 700 of FIG. 7 can have multiple PCIe ports, and any function (Function A 704, Function B 706, Function C 708) inside the device 700 can use any one or multiple of those PCIe ports 710, 712, 714, and 716. In an embodiment of the disclosed technologies, the single device having multiple PCIe ports is enabled to target a specific function's request to an identified PCIe port, thereby reducing CPU clustering interconnect traffic in a multi-processor system and the latency associated with completion of the transactions.

Figure 8:
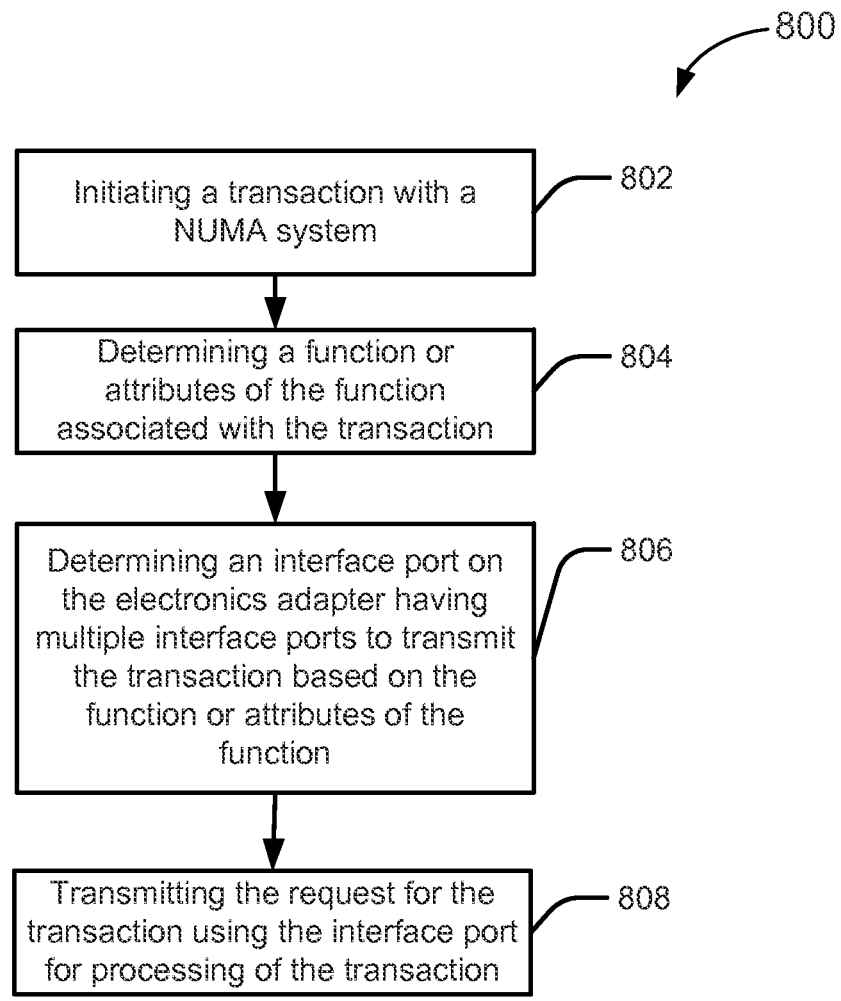
FIG. 8 illustrates a flow diagram illustrating an example method of using multiple interface ports to manage distributed functions to multiple processors of a host according to an embodiment.

FIG. 8 illustrates an example method 800 of managing distributed functions over multiple processors using multiple interfaces according to another embodiment of the disclosed technologies. At 802, a device having multiple interface ports (e.g., PCIe) may initiate a transaction to conduct with a processor that is part of a cluster of processors, like a NUMA system. Each interface port may have a particular, pre-determined data transmission capacity, such as a bandwidth and/or speed of an amount of data per time unit. Each processor may be coupled to a shared storage medium and interconnected to each other. The request may be transmitted by the device having multiple interface ports to operatively couple to a host in connections with the cluster of processors.

At 804, the device may determine a function associated with the transaction. The function may be serviced by a driver in communication with the processor. The driver may be CPU instructions executed by the processor to which the device is coupled to implement the function. Additionally, the determined function may have a required bandwidth. Thus, the device may determine the bandwidth for the function and configure the data transmission capacities of two or more interface ports of the device to accommodate the bandwidth. The function may also have one or more attributes associated with the transaction, for example, data capacity of the function, one or more sub-functions, a timing specification for the function, a receive transaction, a transmit transaction or a processing capacity for the function. The functions and/or the attributes of the transaction associated with the function can be serviced by a corresponding driver executed by any one of the plurality of processors connected to each other.

The function may be determined, for example, using an identifier for a specified function or process, an error check, a bandwidth needed for the function, etc. When the device initiates a transaction with the processor, the identifier for the function may be transmitted to the processor such that the processor can identify the function determined by the adapter.

At 806, at least one of the interface ports of the device may be determined. The determined interface port may transmit the transaction based on the function and/or the attributes of the transaction associated with the function. The device may further detect a transmission protocol of the interface ports, such as PCIe, SATA, etc. The transmission protocol may be determined based on the identified interface ports or by any identifier including in the transaction.

Determining the interface port on the adapter from which to transmit the request for the transaction can include accessing a mapping between the function and the interface port from the plurality of interface ports. The mapping may be stored in memory on the electronics adapter, and can also include a mapping between the attributes of the transaction to a corresponding interface port. The mapping may be stored in a table or any other format that may be accessed and updated. The mapping may further include a mapping of the drivers to their associated processors and their corresponding memories. The memories may be identified by a memory address and may be shared across the multiple processors.

The controller of the electronics adapter may be further configured to update the mapping between the function and/or the attributes of the transaction associated with the function, and the interface port. The updated mapping may be in response to a migration of the driver for the function and/or attributes of the transaction from the identified processor to another processor.

At 808, the electronics adapter transmits a request for the transaction using the interface port for processing of the transaction by the at least one of the plurality of processors coupled to the interface port. In some embodiments, the transaction initiated by the device with the NUMA system may include an identifier for the transaction. The identifier may have information relating to the target processor selected from the plurality of processors, a corresponding driver, and/or identified interface ports to transmit the transaction through.

In some embodiments, the device may receive data from the processor via one port and redirect its associated function. In another embodiment, data may be received from multiple ports for a single function and may be merged for the function.

In some embodiments, the processor may access and read the mapping or have its own mapping of the plurality of host processors and their PCIe interfaces to the associated driver. The host may navigate data for the function in the transaction from the receiving PCIe interface to identified drivers and their associated processors configured for the requested function. The table may then be updated to reflect changes and map the PCIe ports to memory addresses of the shared mediums based on the requested function.

According to another embodiment, the host may identify one or more sub-functions and/or attributes of a transaction associated with the function, for example a transmit or receive signal of a function may be split into two sub-functions. Drivers associated with the sub-functions may be determined and the table can be updated to reflect the mapping from the drivers to the sub-functions to their associated interface ports.

According to another embodiment of the disclosed technologies, multiple processors may be interconnected together in one coherent domain. Different processes may be running on different processors; thus it may be advantageous to target I/O requests to an individual processor that is running the associated process. This reduces latency, jitter, and delays in processing the request, because it eliminates the problem of sending a request to a processor that is not configured to run the process, so that the processor sends the request over the CPU clustering interconnect to the correct processor. Thus, according to embodiments of the disclosed technologies, targeting the request to the right processor upfront, using multiple interface ports, eliminates unnecessary traffic in between the processors. Interconnections between the processors result in increased latency and increased jitter; therefore embodiments of the disclosed technologies provide solutions to avoid unnecessary traffic and communications within the cluster of processors.

It should be appreciated that the specific steps illustrated in FIG. 8 provide a particular method of distributed function management using multiple interface ports, according to one embodiment. Other sequences of steps may also be performed in alternate embodiments. For example, alternative embodiments may perform the steps/blocks outlined above in a different order. Moreover, the individual steps/blocks illustrated in FIG. 8 may include multiple sub-steps that may be performed in various sequences as appropriate to the individual step. Furthermore, additional steps/blocks may be added or removed depending on the particular applications. One of ordinary skill in the art would recognize and appreciate many variations, modifications and alternatives of the process.

It should also be noted that techniques described in FIGS. 1-8 may be in combination with each other without deviating from the scope of the invention.

Figure 9:
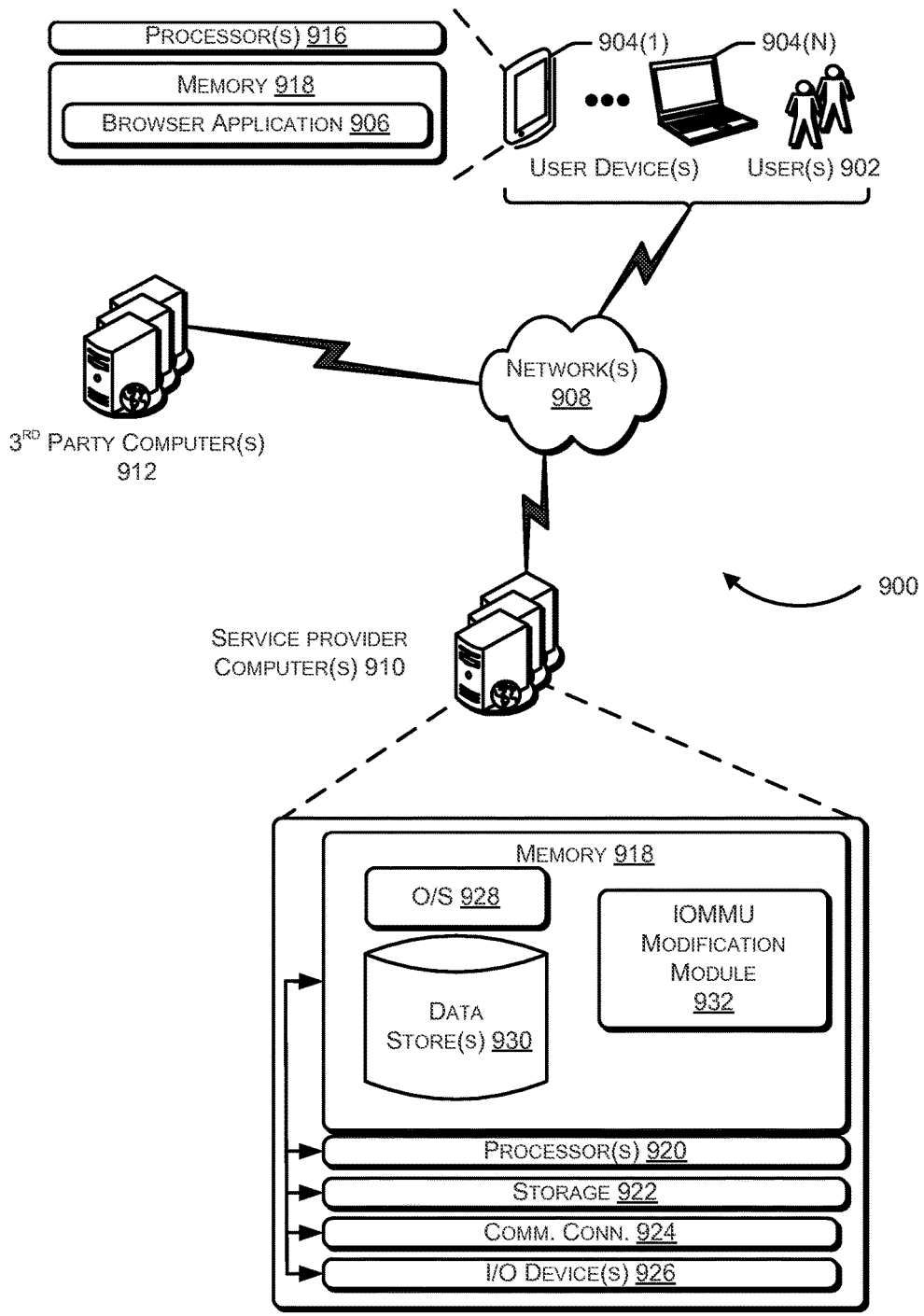
FIG. 9 illustrates an exemplary architecture for features and systems described herein that includes one or more service provider computers and/or a user device connected via one or more networks, according to at least one exemplary embodiment.

FIG. 9 illustrates an exemplary architecture for features and systems described herein that includes one or more host computers and/or a user device connected via one or more networks, according to at least one exemplary embodiment. The host computers discussed in FIGS. 1-8, may use one or more components described in FIG. 9 or may represent one or more components described in FIG. 9. In architecture 900, one or more users 902 may utilize user computing devices 904(1)-(N) (collectively, user devices 904) to access application 906 (e.g., a web browser or mobile device application), via one or more networks 908. In some aspects, application 906 may be hosted, managed and/or provided by a computing resources service or service provider. One or more host computers 910 may provide a native application which is configured to run on user devices 904 which user(s) 902 may interact with. Host computer(s) 910 may, in some examples, provide computing resources such as, but not limited to, client entities, low latency data storage, durable data storage, data access, management, virtualization, cloud-based software solutions, electronic content performance management, etc. Host computer(s) 910 may also be operable to provide web hosting, computer application development and/or implementation platforms, combinations of the foregoing or the like to user(s) 902. Host computer(s) 910, in some examples, may communicate with one or more third party computers 912.

In some examples, network(s) 908 may include any one or a combination of many different types of networks, such as cable networks, the Internet, wireless networks, cellular networks and other private and/or public networks. While the illustrated example represents user(s) 902 accessing application 906 over network(s) 908, the described techniques may equally apply in instances where user(s) 902 interact with host computer(s) 910 via user device(s) 904 over a landline phone, via a kiosk or in any other manner. It is also noted that the described techniques may apply in other client/server arrangements (e.g., set-top boxes, etc.), as well as in non-client/server arrangements (e.g., locally stored applications, etc.).

As described briefly above, application 906 may allow user(s) 902 to interact with host computer(s) 910 such as to access web content (e.g., web pages, music, video, etc.). Host computer(s) 910, perhaps arranged in a cluster of servers or as a server farm, may host application 906 and/or cloud-based software services. Other server architectures may also be used to host application 906. Application 906 may be capable of handling requests from many users 902 and serving, in response, various item web pages. Application 906 can provide any type of website that supports user interaction, including social networking sites, online retailers, informational sites, blog sites, search engine sites, news and entertainment sites and so forth. As discussed above, the described techniques can similarly be implemented outside of application 906, such as with other applications running on user device(s) 1404.

User device(s) 904 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, user device(s) 904 may be in communication with service provider computer(s) 910 via network(s) 908, or via other network connections. Additionally, user device(s) 904 may be part of the distributed system managed by, controlled by or otherwise part of host computer(s) 910 (e.g., a console device integrated with host computers 910).

In one illustrative configuration, user device(s) 904 may include at least one memory 914 and one or more processing units (or processor(s)) 916. Processor(s) 916 may be implemented as appropriate in hardware, computer-executable instructions, firmware, or combinations thereof. Computer-executable instruction or firmware implementations of processor(s) 916 may include computer-executable or machine-executable instructions written in any suitable programming language to perform the various functions described. User device(s) 904 may also include geo-location devices (e.g., a global positioning system (GPS) device or the like) for providing and/or recording geographic location information associated with user device(s) 904.

Memory 914 may store program instructions that are loadable and executable on processor(s) 916, as well as data generated during the execution of these programs. Depending on the configuration and type of user device(s) 904, memory 914 may be volatile (such as random access memory (RAM)) and/or non-volatile (such as read-only memory (ROM), flash memory, etc.), and/or flops. User device(s) 904 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, memory 914 may include multiple different types of memory, such as static random access memory (SRAM), dynamic random access memory (DRAM), or ROM.

Turning to the contents of memory 914 in more detail, memory 914 may include an operating system and one or more application programs or services for implementing the features disclosed herein including at least a user provided input element or electronic service web page, such as via browser application 906 or dedicated applications (e.g., smart phone applications, tablet applications, etc.). Browser application 906 may be configured to receive, store and/or display a website or other interface for interacting with service provider computer(s) 910. Additionally, memory 914 may store access credentials and/or other user information such as, but not limited to, user IDs, passwords and/or other user information. In some examples, the user information may include information for authenticating an account access request such as, but not limited to, a device ID, a cookie, an IP address, a location or the like. In addition, the user information may include a user-provided response to a security question or a geographic location obtained by the user device 904.

In some aspects, host computer(s) 910 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, host computer(s) 910 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, host computer(s) 910 may be in communication with user device(s) 904 and/or other service providers via network(s) 908, or via other network connections. Host computer(s) 910 may include one or more servers, perhaps arranged in a cluster, as a server farm, or as individual servers not associated with one another. These servers may be configured to implement the keyword classification and rating feature services described herein as part of an integrated, distributed computing environment.

In one illustrative configuration, host computer(s) 910 may include at least one memory 918 and one or more processing units (or processor(s)) 920. Processor(s) 920 may be implemented as appropriate in hardware, computer-executable instructions, firmware or combinations thereof. Computer-executable instruction or firmware implementations of processor(s) 920 may include computer-executable or machine-executable instructions written in any suitable programming language to perform the various functions described.

In some instances, hardware processor(s) 920 may be a single core processor or a multi-core processor. A multi-core processor may include multiple processing units within the same processor. In some embodiments, the multi-core processors may share certain resources, such as busses and second or third level of cache between multiple-cores. In some instances, each core in a single or multi-core processor may also include multiple executing logical processors (or threads). In such a core (that supports multiple logical processors), several stages of the execution pipeline and also lower level caches may also be shared.

Memory 918 may store program instructions that are loadable and executable on processor(s) 920, as well as data generated during the execution of these programs. Depending on the configuration and type of service provider computer(s) 910, memory 918 may be volatile (such as RAM) and/or non-volatile (such as ROM, flash memory, etc.). Service provider computer(s) 910 or servers may also include additional storage 922, which may include removable storage and/or non-removable storage. The additional storage 922 may include, but is not limited to, magnetic storage, optical disks and/or tape storage. The disk drives and their associated computer-readable media may provide non-volatile storage of computer-readable instructions, data structures, program modules and other data for the computing devices. In some implementations, memory 918 may include multiple different types of memory, such as SRAM, DRAM, or ROM.

Memory 918, the additional storage 922, both removable and non-removable are all examples of computer-readable storage media. For example, computer-readable storage media may include volatile or non-volatile, removable or non-removable media implemented in any method or technology for storage of information such as computer-readable instructions, data structures, program modules or other data. Memory 918 and the additional storage 922 are all examples of computer storage media. Additional types of computer storage media that may be present in host computer(s) 910 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by service provider computer(s) 910. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

Host computer(s) 910 may also contain communications connection(s) 924 that allow host computer(s) 910 to communicate with a stored database, another computing device or server, user terminals and/or other devices on network(s) 908. Service provider computer(s) 910 may also include I/O device(s) 926, such as a keyboard, a mouse, a pen, a voice input device, a touch input device, a display, speakers, a printer and the like.

Memory 918 may include an operating system 928, one or more data stores 930 and/or one or more application programs or services for implementing the features disclosed herein, including optionally an IOMMU modification module 932. The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 9, and/or functions described herein can be provided by one or more modules that exist as separate modules and/or module functions described herein can be spread over multiple modules.

Figure 10:
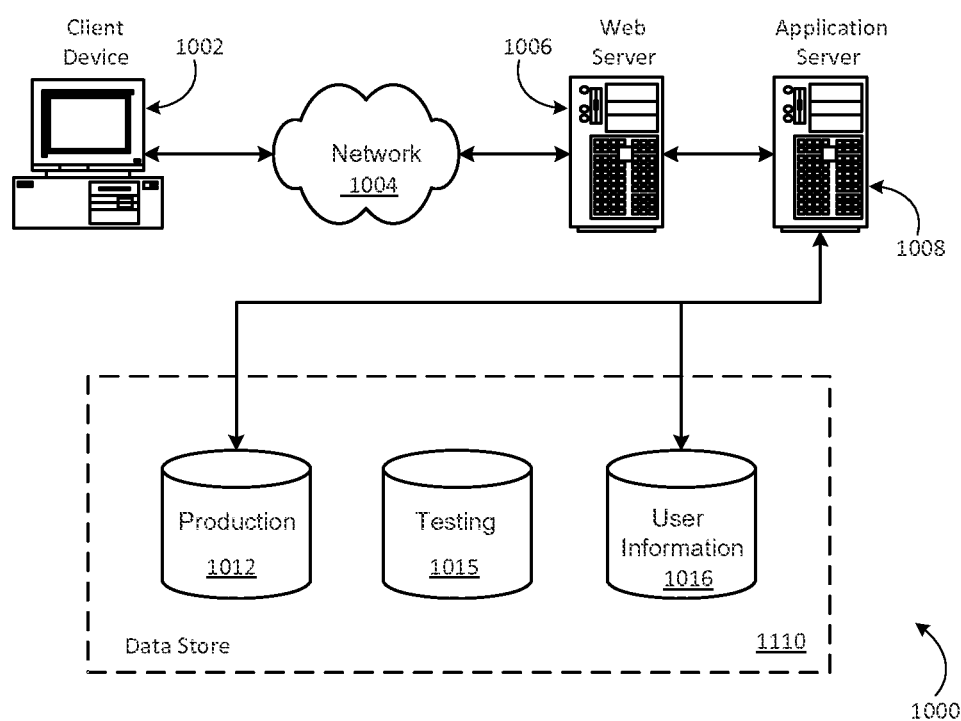
FIG. 10 illustrates an environment in which various embodiments can be implemented.

FIG. 10 illustrates aspects of an exemplary environment 1000 for implementing various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between client device 1002 and application server 1008, can be handled by the Web server. It should be understood that the Web and application servers are not required and are merely example components, as structured code discussed herein can be executed on any appropriate device or host machine as discussed elsewhere herein.

Data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store may also include a mechanism for storing log data, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in data store 1010. Data store 1010 is operable, through logic associated therewith, to receive instructions from application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on user device 1002. Information for a particular item of interest can be viewed in a dedicated page or window of the browser. Several different types of devices, such as user devices and servers have been described with reference to FIG. 10. The hosts discussed in FIGS. 1-8, may use one or more components of the devices described in FIG. 10 and/or represent one or more devices described in FIG. 10.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An electronics adapter, comprising:
a plurality of Peripheral Component Interconnect express (PCIe) interface ports each having a number of lanes for data transmission, the plurality of PCIe interface ports coupled to a host computer; and
a controller in communication with the plurality of PCIe interface ports and configured to:
 determine a first function associated with data to be transmitted between the host computer and the electronics adapter, wherein the first function is mapped to a first PCIe interface port from the plurality of PCIe interface ports,
 identify a second function corresponding to the first function, wherein the second function is mapped to a second PCIe interface port from the plurality of PCIe interface ports, and
 send a first data transmission request to the host computer for a first portion of the data via the first PCIe interface port and a second data transmission request to the host computer for a second portion of the data via the second PCIe interface port, wherein the controller is configured to use the first PCIe interface port for the first portion of the data and the second PCIe interface port for the second portion of the data, wherein the data is mapped for transmission using the first function associated with the first PCIe interface port.

2. The electronics adapter of claim 1, wherein the first data transmission request and the second data transmission request are for reading data from the host computer coupled to the electronics adapter using the first PCIe interface port and the second PCIe interface port, respectively.

3. The electronics adapter of claim 1, wherein the first data transmission request and the second data transmission request are for writing data to the host computer coupled to the electronics adapter using the first PCIe interface port and the second PCIe interface port.

4. The electronics adapter of claim 2, wherein the controller is further configured to:
receive, from the host computer, the first portion of the data using the first PCIe interface port in response to the first data transmission request; and
receive, from the host computer, the second portion of the data using the second PCIe interface port in response to the second data transmission request.

5. The electronics adapter of claim 4, wherein the controller is further configured to:
determine that the second portion of the data is associated with the second function, wherein the second function is a non-operative function corresponding to the first function; and
route the second portion of the data to the first function.

6. The electronics adapter of claim 5, wherein the controller is further configured to merge the first portion of the data and the second portion of the data for performing operations associated with the first function.

7. A device, comprising:
a plurality of interface ports each having a transmission capacity; and
a controller in communication with the plurality of interface ports, configured to:
 determine a first function associated with data to be transmitted between the device and a host computer;
 identify at least a first interface port and a second interface port from the plurality of interface ports for the data to be transmitted;
 send a first data transmission request to the host computer for a first portion of the data via the first interface port and a second data transmission request to the host computer for a second portion of the data via the second interface port, wherein the first data transmission request and the second data transmission request are for reading the data from the host computer coupled to the device using the first interface port and the second interface port, respectively,
 receive, from the host computer, the first portion of the data using the first interface port in response to the first data transmission request; and
 receive, from the host computer, the second portion of the data using the second interface port in response to the second data transmission request.

8. The device of claim 7, wherein the controller is further configured to route the second portion of the data to the first function.

9. The device of claim 7, wherein the first portion of the data is transmitted over the first interface port and the second portion of the data is transmitted over the second interface port.

10. The device of claim 7, wherein the controller is configured to identify the first interface port using the first function and the second interface port using a second function, wherein the second function is a non-operative function coupled to the first function.

11. The device of claim 7, wherein the plurality of interface ports are Peripheral Component Interconnect (PCI), PCIe, RapidIO, Infiniband, or Serial Advanced Technology Attachment (SATA).

12. The device of claim 8, wherein the controller is further configured to merge the first portion of the data and the second portion of the data for performing operations associated with the first function.

13. A device, comprising:
a plurality of interface ports each having a transmission capacity; and
a controller in communication with the plurality of interface ports, configured to:
 determine a first function associated with data to be transmitted between the device and a host computer;
 identify at least a first interface port and a second interface port from the plurality of interface ports for the data to be transmitted; and
 send a first data transmission request to the host computer for a first portion of the data via the first interface port and a second data transmission request to the host computer for a second portion of the data via the second interface port, wherein the first data transmission request and the second data transmission request are for writing the data to the host computer coupled to the device using the first interface port and second interface port, respectively.

14. The device of claim 13, wherein the first portion of the data is transmitted over the first interface port and the second portion of the data is transmitted over the second interface port.

15. The device of claim 13, wherein the controller is configured to identify the first interface port using the first function and the second interface port using a second function, wherein the second function is a non-operative function coupled to the first function.

16. The device of claim 13, wherein the plurality of interface ports are Peripheral Component Interconnect (PCI), PCIe, RapidIO, Infiniband, or Serial Advanced Technology Attachment (SATA).

\* \* \* \* \*